United States Patent [19]
Paryani et al.

[11] Patent Number: 6,011,380
[45] Date of Patent: Jan. 4, 2000

[54] REFRESHING CHARGE CONTROL METHOD AND APPARATUS TO EXTEND THE LIFE OF BATTERIES

[75] Inventors: Anil Paryani, Long Beach; Yasuyuki Sando, Rancho Palos Verdes, both of Calif.

[73] Assignee: Honda Giken Kogyo Kabushiki Kaisha, Tokyo, Japan

[21] Appl. No.: 09/282,263

[22] Filed: Mar. 31, 1999

[51] Int. Cl.[7] .......................... H01M 10/44; H01M 10/46
[52] U.S. Cl. .......................... 320/132; 320/150; 320/160
[58] Field of Search ..................... 320/124, 125, 320/128, 130, 132, 135, 137, 150, 160, DIG. 21

[56] References Cited

U.S. PATENT DOCUMENTS 5,617,009  4/1997  Takao et al. .
5,819,187  10/1998  Sato et al. .

*Primary Examiner*—Edward H. Tso
*Attorney, Agent, or Firm*—Pearne, Gordon, McCoy & Granger LLP

[57] ABSTRACT

A method and apparatus for charging a battery which is operable to normally charge the battery at a first state of charge setting, to determine when the battery has been undercharged a predetermined number of times, and to charge the battery at a second state of charge setting after the battery is undercharged the predetermined number of times. The second state of charge setting is greater than the first state of charge setting. The method includes determining when the state of charge of the battery is below a predetermined level, charging the battery at the first state of charge setting, calculating a number of charging times when the battery was charged below the predetermined level after the last time the battery was charged at the predetermined level, and charging the battery with a second state of second charge setting when the calculated number of charging times equals a predetermined number. The apparatus includes a sensor for sensing the state of charge of the battery, a counter for counting the number of charging times that the battery was charged below a predetermined level after the last time the battery was charged to the predetermined level, and a charger for applying the second state of charge setting when the number of charging times counted by the counter equals the predetermined number.

26 Claims, 4 Drawing Sheets

REFRESHING CHARGE CONTROL METHOD AND APPARATUS TO EXTEND THE LIFE OF BATTERIES

BACKGROUND OF THE INVENTION

1. Field of the Invention

The present invention generally pertains to nickel-metal hydride batteries and, more particularly to methods and apparatus to recharge such batteries.

2. Description of Related Art

A Nickel-Metal Hydride (hereafter NiMH) battery has a State-of-Charge (SOC) associated therewith. Generally speaking, there are two types of SOC: discharging SOC and charging SOC. The discharging and charging SOC are related such that 100% discharging SOC is equal to the charging SOC needed to fully charge the battery (conventionally 110%–120%). The SOC is related to the battery capacity, such that a fully charged battery has 100% discharging SOC. When a NiMH battery is repeatedly undercharged (<105% charging SOC), its voltage tends to be temporarily reduced. In this regard, undercharging can be either caused manually by the user (premature ending of charging operation and subsequent discharge) or by high temperature operation (automatic termination of charging operation due to high temperature conditions). Undercharging and resulting voltage reduction leads to a reduction in battery capacity, otherwise known as the "memory effect".

Memory effect is the temporary under-voltage state a NiMH battery is under when repeatedly under-charged or not completely discharged. The memory effect reduces the battery capacity, and can result in a shorter range and slower acceleration in an electric vehicle, or reduced run-time in a cellular phone, portable computer, power-tool, or video camera. In addition, the memory effect makes it difficult for a battery management system to distinguish between an actual deteriorated battery and a battery with memory effect.

In response to the problems posed by the "memory effect", a recharging method wherein a high charging SOC is applied, illustrated in FIG. 1, has become conventional. Unfortunately, as will be discussed more fully hereafter, the conventional solution to the "memory effect" problem, while theoretically appealing, has several real-world drawbacks that limit its useful application.

As is shown schematically in FIG. 1, during each recharge cycle a charging SOC of between about 110% to 120% SOC is applied to the battery. The recharging operation is terminated when the preset SOC limit has been reached. The two most common methods for determining the end of charge (EOC) or charging SOC limit of a NiMH battery are a negative change in voltage (−dV) or a time-based temperature gradient (dT/dt). Setting the charging SOC limit in excess of 105% SOC theoretically ensures maximum discharge capacity from the battery and reduces the memory effect.

However, when a NiMH battery is being charged in accordance with the conventional method illustrated in FIG. 1, heat is produced as a result of exothermic reactions, joule losses, and pressure build-up through oxygen evolution of the positive electrode. High temperature operation severely degrades the cycle life of NiMH batteries, and limits their useful life.

In order to fully practice the aforementioned conventional method, it may be necessary to actively cool the NiMH battery while recharging same. However, development of a low cost, light weight, efficient cooling system for a NiMH battery pack has proven difficult. Such a cooling system would be especially desirable for NiMH batteries used in electric vehicles, most notably when such vehicles are used in hot areas or during the summer months.

Accordingly, recharging in accordance with the conventional method illustrated in FIG. 1 will lead to heat generation and shortened battery life. A low SOC setting (less than 105% charging SOC) for recharging will reduce battery capacity and cause the memory effect.

Accordingly, there is a need in the art for a method and a device for effectively recharging a NiMH battery wherein the potential for damaging heat generation and memory effect is reduced.

SUMMARY OF THE INVENTION

The present invention is directed toward a method and a device for effectively recharging a NIMH battery wherein the potential for heat generation and memory effect is reduced.

In accordance with a first embodiment of the present invention, the charging SOC applied by a battery charger to a NiMH battery depends upon at least a predetermined number of previous charge cycles. The battery charger normally applies a first charging SOC to the battery. The battery charger monitors charging operations and determines if a charging operation has been terminated prematurely, indicative of an undercharge cycle. After a predetermined number of undercharge cycles, the battery charger applies a second charging SOC to the battery. The second charging SOC is higher than the first or normal charging SOC.

In accordance with a second embodiment of the present invention, the charging SOC applied by a battery charger to a NiMH battery depends upon at least a predetermined number of previous charge cycles and whether the battery is operating under high-temperature conditions. The battery charger normally applies a first charging SOC to the battery. The battery charger monitors charging operations and determines if a charging operation has been previously terminated prematurely, indicative of an undercharge cycle. After a predetermined number of undercharge cycles, the battery charger applies a second charging SOC to the battery. The second charging SOC is higher than the first or normal charging SOC.

In further accordance with the second embodiment of the present invention, whether the battery is operating under high temperature conditions is determined. If the battery is in a high-temperature condition, the first charging SOC is applied. If the battery is not in a high-temperature condition, the first or second charging SOC is applied depending upon the determination of whether the previous charging operations have been terminated prematurely.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
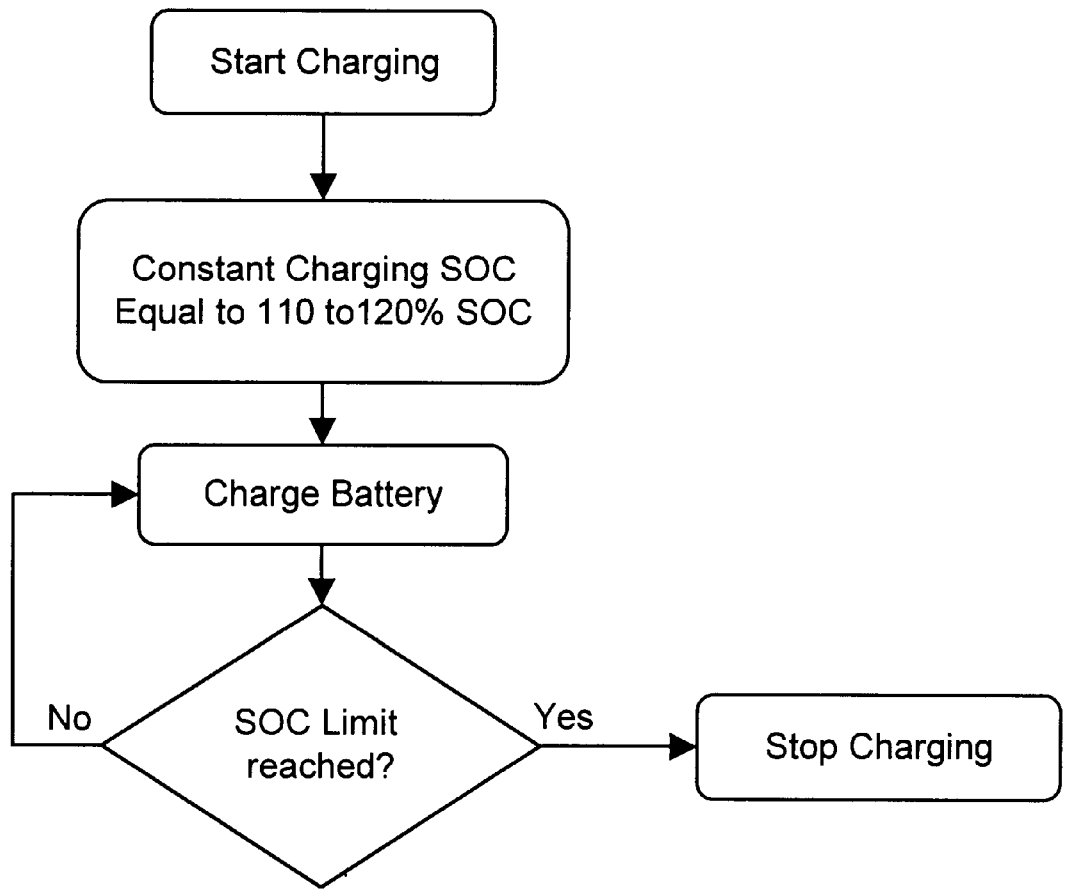
FIG. 1 is a flow chart illustrating a conventional NiMH battery charging method.

It should be noted that in the detailed description which follows, identical components have the same reference numeral, regardless of whether they are shown in different embodiments of the present invention. It should also be noted that, in order to clearly and concisely disclose the present invention, the drawings may not necessarily be to scale and certain features of the invention may be shown in somewhat schematic form.

Figure 2:
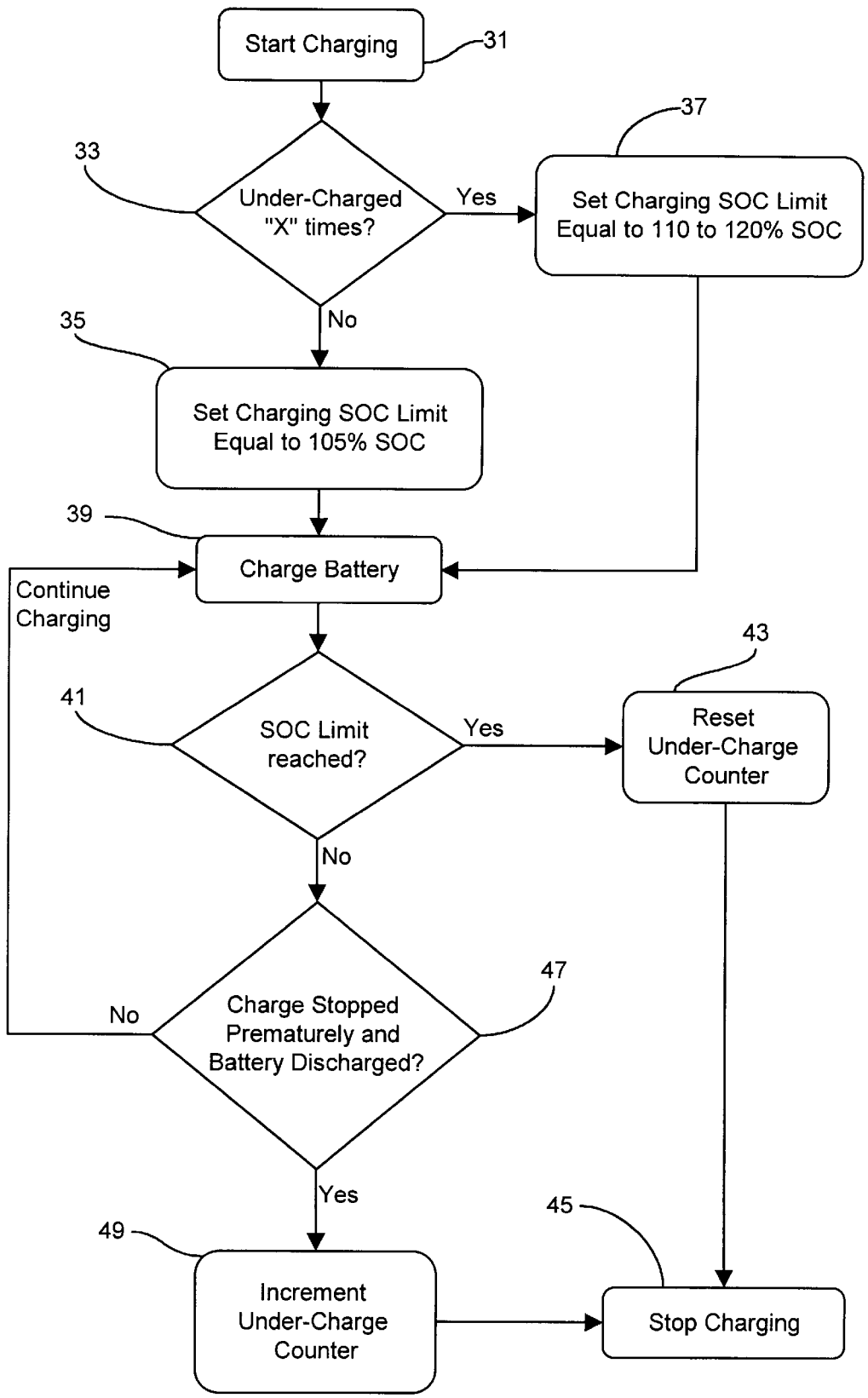
FIG. 2 is a flow chart illustrating a NiMH battery charging method in accordance with a first embodiment of the present invention.

With reference to FIG. 2, a first preferred embodiment of the method according to the present invention will hereafter be described. When a charging operation is initiated (31), the system first checks, in block 33, to see if the battery has been undercharged a predetermined number of times (X) since the last time an increased charging SOC limit (110%–120% SOC) was used. If the number of undercharge cycles is less than the predetermined number (X), wherein preferably $1 \leq X \leq 5$, the charging SOC limit is set to 105% SOC (35) and charging begins (39). If, on the other hand, the number of undercharge cycles is equal to the predetermined number (X), the charging SOC limit is set to a higher value, between about 110%–120% SOC (37), before charging begins (39).

During charging, the battery is continually monitored to determine if the SOC limit has been reached (41) or whether the charging operation has been terminated prematurely and the battery subsequently discharged (47). Premature termination and subsequent battery discharge, as used herein, is meant to describe both manual and automatic termination of the charging operation. Manual termination of the charging operation is when the user has suspended charging, and then has discharged the battery before re-initiating charging. Automatic termination may be due to high temperature (thermal cut-off) of when the charging operation is complete (dT/dt or –dV reached), but the charging SOC limit has not been reached (discussed hereinafter). The charging SOC limit is that set in the previous steps.

When the charging SOC limit is reached, the charging operation has been completely successful. Accordingly, the under-charge counter is reset (43) and charging is terminated (45).

If the SOC limit has not been reached, and the charging operation is terminated prematurely and the battery discharged (47), the charging operation has not been completely successful. Accordingly, the under-charge counter is incremented (49) and charging operation is terminated (45). The value of the under-charge counter is compared, in subsequent charging operations, to the predetermined number (X) (in block 33) to determine which charging SOC limit will be used in charging the battery.

Figure 3:
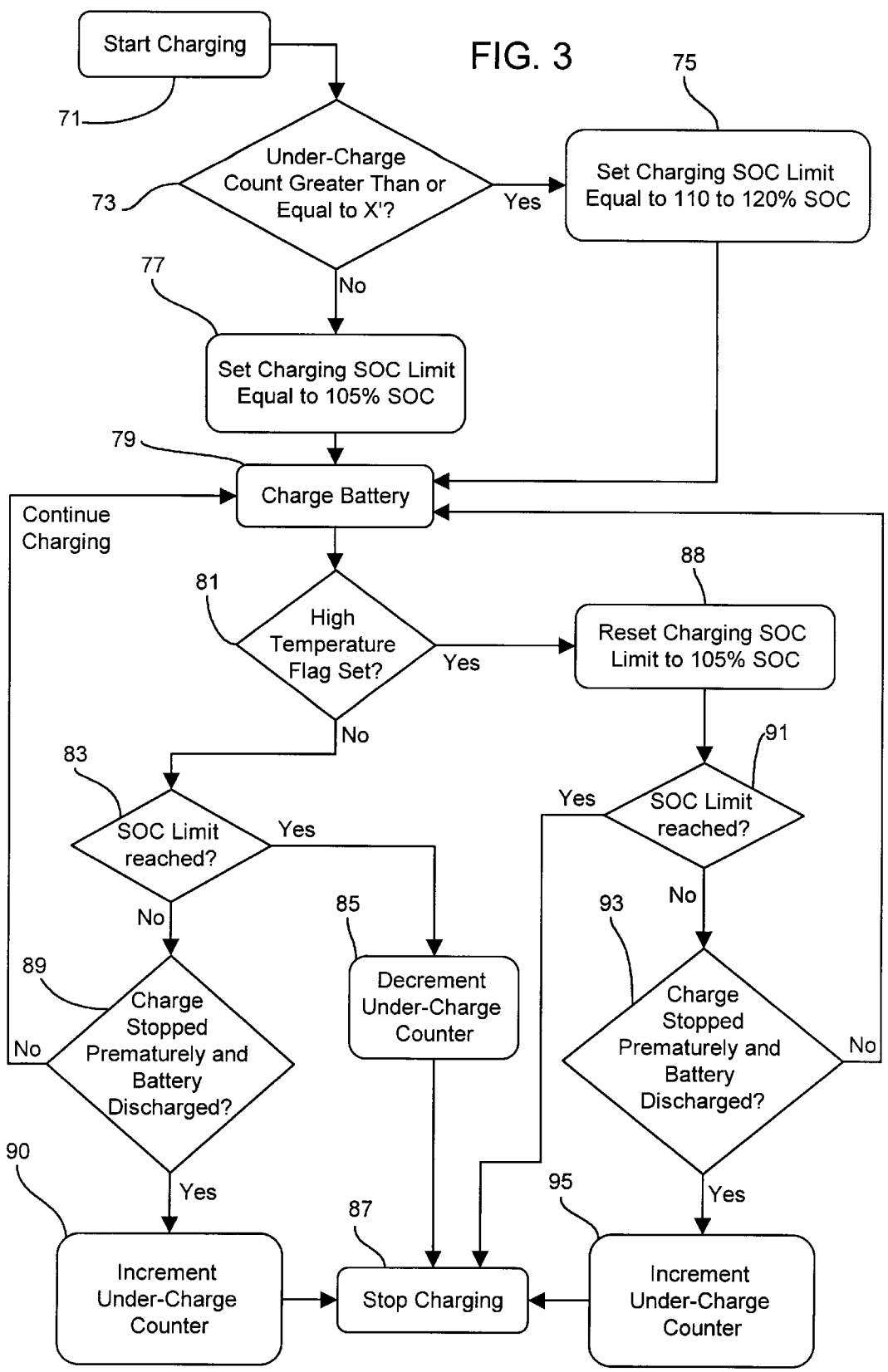
FIG. 3 is a flow chart illustrating a NiMH battery charging method in accordance with a second embodiment of the present invention.

With reference to FIG. 3, a second preferred method according to the present invention is illustrated. In this embodiment, battery temperature is monitored during the charging operation and used to control the charging SOC limit that is applied.

When a charging operation is initiated (71), the system first checks, in block 73, to determine whether the battery under-charge counter is equal to a predetermined number (X'). In this case, the predetermined number (X') is preferably greater than or equal to 1 and less than or equal to 5.

If the under-charge count is equal to or greater than the predetermined number (X'), the charging SOC limit is set to between 110%–120% SOC (75), and the charging operation begins (79). On the other hand, if the under-charge count is less than the predetermined number (X'), the charging SOC limit is set to the normal, lower value of 105% SOC (77) before the charging operation begins (79).

As will be described more fully hereinafter, during the charging operation in accordance with the second preferred embodiment, battery temperature (81), charging SOC limit (83, 91), and premature termination of charging (89, 93), are monitored and used to increment/decrement the under-charge counter as well as to reset the charging SOC limit to the normal, lower value under high temperature conditions.

The battery temperature is monitored (81) and a high temperature flag is set if the battery temperature is indicative of high temperature conditions wherein the battery is less able to receive a charge. It has been found that battery temperatures between about 30° to 40° C. at 105% SOC, or between about 40° to 50° C. at any time during the charging operation, are indicative of such high temperature conditions. The set points for the high temperature flag in the preferred embodiment of the present invention are 35° C. during normal charging (105% SOC) and 42° C. at any time during the charging operation.

Assuming that the high temperature flag is not set (non-high temperature conditions), the battery is continually monitored to determine if the charging SOC limit has been reached (83) and whether the charging operation has been terminated prematurely and the battery discharged (89). As noted before, the charging SOC limit is that set in the previous steps, and the charging operation may be terminated prematurely either manually or automatically.

Accordingly, in the second preferred embodiment, charging at the relatively higher charging SOC limit or refresh charge cycle can be applied to the battery only under non-high temperature conditions. This reduces the possibility of problematic heat generation during the refresh charge cycle. Moreover, as will be apparent, if the battery is severely undercharged (due to premature termination of the previous charging operations or high-temperature conditions in previous charge cycles), two or more consecutive refresh charge cycles using the elevated charging SOC limit (110%–120% SOC) can be applied to the battery.

When the charging SOC limit is reached, the charging operation has been completely successful. Accordingly, in this embodiment the under-charge counter is decremented (85) and charging is terminated (87).

If the charging SOC limit has not been reached, and the charging operation is terminated prematurely and the battery discharged (89), the charging operation has not been completely successful. Accordingly, the under-charge counter is incremented (90) and the charging operation is terminated (87). The value of the under-charge counter is compared, in subsequent charging operations, to the predetermined number (X') (in block 73) to determine which charging SOC limit will be used in charging the battery.

Assuming that the high-temperature flag has been set (81), the charging SOC limit is reset to 105% SOC (88). Thereafter, the battery is continually monitored to determine if the charging SOC limit has been reached (91) and if the charging operation has been terminated prematurely (93). As noted before, the charging SOC limit is that set in the previous steps (in this case 105% SOC), and the charging operation may be terminated prematurely either manually or automatically.

When the charging SOC limit is reached, the charging operation has been successful, except for the temperature flag being set. However, because the charging SOC limit was reached, the high temperature conditions did not reduce the charge acceptance of the battery. Therefore, the undercharge count is not incremented or decremented, and the charging operation is terminated (87). Under these conditions, a subsequent charging operation of the battery will use the same charging SOC limit. If an increased charging SOC limit was being used before the high temperature flag was set, then this increased SOC limit will be used in the subsequent operation.

If the charging SOC limit has not been reached, and the charging operation is terminated prematurely (93), the charging operation has not been completely successful. Accordingly, the under-charge counter is incremented (95) and charging is terminated (87). As noted previously, the value of the under-charge counter is compared, in subsequent charging operations, to the predetermined number (X') to determine which charging SOC limit will be used in charging the battery.

Figure 4:
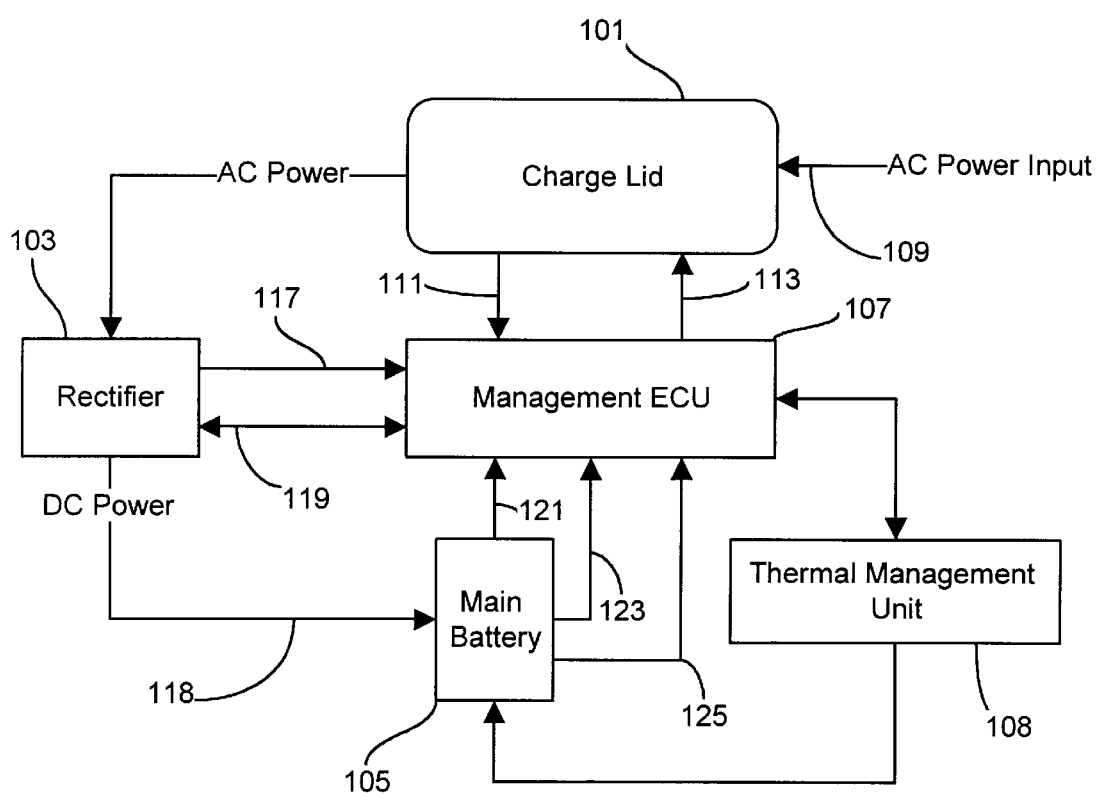
FIG. 4 is a block diagram schematically illustrating an apparatus for practicing the first and second methods of the present invention.

With reference to FIG. 4, a block diagram that schematically represents a charging control circuit for practicing the present invention is provided. The charging control circuit includes a charge lid 101, a rectifier 103, a main battery 105, and a management ECU 107. The management ECU serves as a memory device, and provides program operations and communication between the other devices, as will be apparent from the following discussion. The management ECU may also include, or be connected to, an optional thermal management unit 108. Such a thermal management is operable, under the control of the ECU 107, to heat and/or cool the main battery 105, as desired.

When an AC power connector 109 is inserted into a charge port on the charge lid 101, a charge cable connector signal is transmitted to the ECU via line 111 and a charge panel indicator signal is sent, via line 113, from the ECU 107 to illuminate an indicator (not shown) on the charge lid 101. AC power is communicated via line 115 to the rectifier 103, and DC power is transmitted, under the control of the ECU 107, to the battery 105 from the rectifier 103 via line 118. The rectifier 103 sends a "ready" signal via line 117 to the ECU.

Data communication between the ECU 107 and the rectifier 103 is provided by communication line 119. The data communicated includes charging mode instructions (fixed power, fixed current, fixed voltage), instructions on charge power, voltage, and current, as well as rectifier data (from the rectifier 103).

The battery 105 provides data signals to the ECU 107 indicative of the battery condition via lines 121, 123, and 125. These signals preferably include temperature data, current data, and voltage data. The ECU 107 uses the data provided by the battery 105 to control the operation of the rectifier 103 in accordance with the first and second embodiments of the method previously discussed with reference to FIGS. 2–3. For example, the ECU 107 includes the under-charge counter, the high temperature flag, determines when charging has been prematurely terminated, determines the charging SOC limit to be used based upon the value in the under-charge counter, and determines whether the charging SOC limit has been reached.

While several methods may be used by the ECU 107 to determine whether the charging SOC limit has been reached, the following sets forth the preferred methods currently contemplated. According to a first method:

$$CChgAh = ((SOCsetting - 100\%)) * Rated\ Ah + DchAh \quad (1)$$

wherein CChgAh is calculated charging ampere-hour, SOCsetting is the charging SOC limit, Rated Ah is the rated capacity of the battery in ampere-hours, and DchAh is the discharging ampere-hour measurement during discharge or usage since the previous charge cycle.

For example, if a charging SOC limit of 105% is used (SOCsetting=105%), the battery has a rated capacity of 94 Ah (Rated Ah=94 Ah), and battery was previously discharged 20 Ah (DchAh=20 Ah), then the calculated charging ampere-hour to charge the battery:

$$CChgAh = ((105\%\ SOC - 100\%\ SOC)) * 94Ah + 20\ Ah$$

$$CChgAh = (0.05 * 94\ Ah) + 20Ah = 24.7\ Ah$$

In the same case, a charging SOC limit of 110% SOC will result in a calculated charging ampere-hour of 29.4 Ah.

Accordingly, the ECU 107 compares the measured charging ampere-hours (derived from data provided by the battery during charging) to the calculated charging ampere-hours (CChgAh), found in equation (1), to determine whether the charging SOC limit has been reached.

The ECU 107 ends the charging cycle by using dT/dt or –dV control along with the ampere-hour limit. After the charging cycle is terminated, the ECU 107 compares the measured charging ampere-hours to the calculated charging ampere-hours to determine whether the charging SOC limit has been reached.

DT/dt control is usually most effective to prevent overcharging and heat generation. The dT/dt and/or –dV values, which are stored in the ECU 107, are correlated to the charging SOC and are previously determined in a controlled laboratory environment for each desired SOC setting. For example, a dT/dt of 1.5° C. over 20 minutes corresponds to a charging SOC of 105%. If a higher SOC setting (i.e., 110–120%) is used, then several options can be employed. One option is to use a higher dT/dt setting. Alternatively, the lower dT/dt setting may be used and then followed by a small C-rate charge (i.e., C/20) for a few hours, or a dV charge. The C-rate charge is defined as the one-hour current rate to charge a battery (a 3.5 Ah rated battery has a C-rate of 3.5A; the 2C rate of the same battery is 7A).

After the dT/dt or –dV charging is complete or terminated, the ECU 107 compares the measured charging ampere-hours to the calculated charging ampere-hours and adjusts the undercharge count accordingly.

According to an alternative method of determining when the charging SOC limit has been reached, the ECU calculates the charging SOC and compares the calculated charging SOC to the preset charging SOC limit. In this alternative, charging SOC limit is calculated using the equation:

$$CCSOC = (1 + (ChgAh - DchAh)/Rated\ Ah) * 100\% \quad (2)$$

wherein CCSOC is the calculated charging SOC, ChgAh is the charging ampere-hour measured during charging, DchAh is the discharge ampere-hour measured during discharge or usage since the previous charge cycle, and Rated Ah is the rated capacity of the battery in ampere-hours.

Using the same numbers as before, if ChgAh=24.7 Ah, DchAh=20 Ah, Rated Ah=94 Ah then:

$$CCSOC = (1 + (24.7 - 20)/94) * 100\%$$

$$CCSOC = (1 + 0.05) * 100\% = 105\%$$

Therefore, the calculated charging SOC is equal to the charging SOC limit when the measured charging ampere-hour applied to the battery is 24.7 Ah. When the measured charging ampere-hour is less than 24.7 Ah, the calculated charging SOC is less than the charging SOC limit.

In accordance with this alternative method, the ECU 107 compares the calculated charging SOC, found in equation (2), to the charging SOC limit. The ECU 107 terminates the charging operation when the calculated SOC equals the charging SOC limit.

As discussed above, the ECU 107 uses data provided from the battery 105 to control charging operations in accordance with at least the foregoing equations to determine when the charging operation is complete (i.e., when the charging SOC limit has been reached). It is considered apparent that the foregoing alternative methods for determining when the charging operation has been successful are equivalent, yield the same result, and may be used interchangeably by the ECU 107 to determine whether the charging SOC limit has been reached (47, 83, 91). It is further contemplated that other calculations for determining whether the charging SOC limit has been reached may be interchanged for those set forth herein without departing from the scope and spirit of the present invention.

While the preferred embodiment of the present invention is shown and described herein, it is to be understood that the same is not so limited but shall cover and include any and all modifications thereof which fall within the purview of the invention. For example, although the terms "increment" and "decrement" are used herein, it is noted that incrementing and decrementing of the counters does not have to be by one. For instance, the under-charge counter can be incremented by three for each under-charge cycle and decremented by two for each refresh charge cycle. Alternatively, the amount to increment/decrement can be set such that a undercharge cycles results in a desired number of charging cycles at the increased SOC limit (i.e., three undercharge cycles results in two refresh charge cycles). Also, the amount to increment or decrement can be different for different portions of the cycle. For example, if the high temperature flag is set and charging is stopped prematurely, it may be desirable to increment the under-charge counter twice the normal amount that the under-charge counter is incremented.

What is claimed is:

1. A method for charging a battery with at least one of a first state of charge setting and a second state of charge setting, said second state of charge setting being greater than said first state of charge setting, said method comprising the steps of:
   a) determining when the state of charge of said battery is below a predetermined level;
   b) calculating a number of charging times that said battery was charged below said predetermined level after the last time said battery was charged at said predetermined level;
   c) charging said battery at said first state of charge setting if said calculated number is below a predetermined number; and,
   d) charging said battery at said second state of charge setting when said calculated number is equal to said predetermined number.

2. The method of claim 1, comprising the further steps of:
   storing said calculated number of charging times when said battery was charged below said predetermined level;
   resetting said calculated number of charging times after said battery is charged at the predetermined level.

3. The method of claim 1, wherein said predetermined number is between about one and five.

4. The method of claim 1, wherein said first state of charge setting is equal to about 105 percent of a fully charged battery.

5. The method of claim 1, wherein said second state of charge setting is between about 110 and 120 percent of a fully charged battery.

6. The method of claim 1, wherein step b includes the steps of:
   detecting when said battery has been discharged;
   calculating said number of charging times when said battery was charged below said predetermined level and when said battery has been detected to be discharged.

7. A system for charging a battery, said battery being charged with at least one of a first state of charge setting and a second state of charge setting, said second state of charge setting being greater than said first state of charge setting, said system comprising:
   means for charging said battery at said first state of charge setting;
   means for sensing the state of charge of said battery;
   means for determining when the state of charge of said battery is below a predetermined level;
   means for calculating a number of charging times when said battery was charged below said predetermined level after the last time said battery was charged to said predetermined level; and
   means for charging said battery at the second state of charge setting when said number of charging times calculated by said calculating means is at the predetermined number.

8. The system of claim 7, further comprising:
   memory means for storing said number of charging times when said battery was charged below said predetermined level; and
   means for resetting said number of charging times after said battery is charged to a predetermined level.

9. The system of claim 7, wherein said predetermined number of charging times is between about one and five.

10. The system of claim 7, wherein said first state of charge setting is equal to about 105 percent of a fully charged battery.

11. The system of claim 7, wherein said second state of charge setting is between about 110 percent and 120 percent of a fully charged battery.

12. The system of claim 7, wherein said battery is a Nickel-Metal Hydride battery.

13. The system of claim 7, wherein said calculating means includes means for detecting that the battery has been discharged.

14. A method for charging a battery with at least one of a first state of charge setting and a second state of charge setting, said second state of charge setting being greater than said first state of charge setting, said method comprising the steps of:
   a) determining when the state of charge of said battery is below a predetermined level;
   b) calculating a number of charging times when said battery was charged below said predetermined level after the last time said battery was charged at said predetermined level;
   c) charging said battery at said first state of charge setting if said calculated number of charging times is below a predetermined number;
   d) charging said battery at said second state of charge setting when said calculated number of charging times is equal to said predetermined number;
   e) determining if said battery is in a high-temperature condition; and,
   f) charging said battery at said first state of charge setting if it is determined that said battery is in said high temperature condition;

g) charging said battery at said first or second state of charge setting determined in steps (c) and (d) if said battery is not in said high-temperature condition.

15. The method of claim 14, comprising the further steps of:

h) storing said calculated number; and, i) if said battery is not in said high temperature condition and said battery is charged at the predetermined level, decrementing said calculated number.

16. The method of claim 14, comprising the further steps of:

h) storing said calculated number;

i) if said battery is in said high-temperature condition, incrementing said calculated number.

17. The method of claim 16, wherein said calculated number is incremented regardless of whether the battery is charged at the predetermined level.

18. The method of claim 14, wherein said predetermined number is between about one and five.

19. The method of claim 15, wherein said predetermined number is between about one and five.

20. The method of claim 16, wherein said predetermined number is between about one and five.

21. The method of claim 14, wherein said first state of charge setting is equal to about 105 percent of a fully charged battery.

22. The method of claim 15, wherein said first state of charge setting is equal to about 105 percent of a fully charged battery.

23. The method of claim 16, wherein said first state of charge setting is equal to about 105 percent of a fully charged battery.

24. The method of claim 14, wherein said second state of charge setting is between about 110 and 120 percent of a fully charged battery.

25. The method of claim 15, wherein said second state of charge setting is between about 110 and 120 percent of a fully charged battery.

26. The method of claim 16, wherein said second state of charge setting is between about 110 and 120 percent of a fully charged battery.

* * * * *